(12) United States Patent
Ric et al.

(10) Patent No.: US 8,761,993 B2
(45) Date of Patent: Jun. 24, 2014

(54) METHOD AND DEVICE FOR AUTOMATING PROCEDURES FOR VERIFYING EQUIPMENT IN AN AIRCRAFT

(75) Inventors: Georges Ric, Frouzins (FR); Jean-Marc Bonzom, Gagnac sur Garonne (FR); Jean-Pierre Gillet, Grenade (FR)

(73) Assignees: Airbus Operations S.A.S., Toulouse (FR); Airbus, Blagnac (FR)

( * ) Notice: Subject to any disclaimer, the term of this patent is extended or adjusted under 35 U.S.C. 154(b) by 811 days.

(21) Appl. No.: 12/543,181

(22) Filed: Aug. 18, 2009

(65) Prior Publication Data
US 2010/0152954 A1  Jun. 17, 2010

(30) Foreign Application Priority Data
Sep. 15, 2008  (FR) ..................................... 08 56198

(51) Int. Cl.
G01M 17/00 (2006.01)
G06F 7/00 (2006.01)
G06F 11/30 (2006.01)
G06F 19/00 (2011.01)
G07C 5/00 (2006.01)

(52) U.S. Cl.
USPC ........................................ 701/29.1; 701/31.4

(58) Field of Classification Search
USPC ............... 455/431; 701/29.1, 31.4, 31.5, 34.4
See application file for complete search history.

(56) References Cited

U.S. PATENT DOCUMENTS

| 5,570,365 | A | * | 10/1996 | Yoshida | 370/401 |
| 6,119,171 | A | * | 9/2000 | Alkhatib | 709/245 |
| 7,313,822 | B2 | * | 12/2007 | Ben-Itzhak | 726/24 |
| 2004/0111519 | A1 | * | 6/2004 | Fu et al. | 709/229 |
| 2005/0034029 | A1 | * | 2/2005 | Ramberg et al. | 714/43 |
| 2005/0105527 | A1 | * | 5/2005 | Vervust et al. | 370/390 |
| 2005/0246370 | A1 | * | 11/2005 | Rubendall | 707/103 R |
| 2007/0115398 | A1 | * | 5/2007 | Harada et al. | 349/29 |
| 2007/0115938 | A1 | * | 5/2007 | Conzachi et al. | 370/352 |

FOREIGN PATENT DOCUMENTS

WO   WO 00/23894   4/2000

* cited by examiner

Primary Examiner — Thomas Tarcza
Assistant Examiner — Imran Mustafa
(74) Attorney, Agent, or Firm — Oblon, Spivak, McClelland, Maier & Neustadt, L.L.P.

(57) ABSTRACT

A method for testing or evaluating the configuration of at least one equipment item in an aircraft includes receiving at least one command to test or evaluate the configuration of the at least one equipment item via a network interface of a less secure part of an on-board information system of the aircraft. The network interface is capable of exchanging data with an information system external to the aircraft. The method also includes encoding the at least one received command and transmitting the encoded command to the secured part of the information system of the aircraft. In response to reception of the encoded command, the at least one encoded test command is filtered. In response to the filtering, the encoded command is translated and executed in relation to at least one first maintenance function of the secured part.

25 Claims, 7 Drawing Sheets

| CODE ASCII | CARACTERE DE CONTROLE | CODE ASCII |   | CODE ASCII | CARACTERE | CODE ASCII | CARACTERE |
|---|---|---|---|---|---|---|---|
| 000 | NUL | 032 | SP | 064 | @ | 096 | ` |
| 001 | SOH | 033 | ! | 065 | A | 097 | a |
| 002 | STX | 034 | " | 066 | B | 098 | b |
| 003 | ETX | 035 | # | 067 | C | 099 | c |
| 004 | EOT | 036 | $ | 068 | D | 100 | d |
| 005 | ENQ | 037 | % | 069 | E | 101 | e |
| 006 | ACK | 038 | & | 070 | F | 102 | f |
| 007 | BEL | 039 | ' | 071 | G | 103 | g |
| 008 | BS | 040 | ( | 072 | H | 104 | h |
| 009 | HT | 041 | ) | 073 | I | 105 | i |
| 010 | LF | 042 | * | 074 | J | 106 | j |
| 011 | VT | 043 | + | 075 | K | 107 | k |
| 012 | FF | 044 | , | 076 | L | 108 | l |
| 013 | CR | 045 | - | 077 | M | 109 | m |
| 014 | SO | 046 | . | 078 | N | 110 | n |
| 015 | SI | 047 | / | 079 | O | 111 | o |
| 016 | DLE | 048 | 0 | 080 | P | 112 | p |
| 017 | DC1 | 049 | 1 | 081 | Q | 113 | q |
| 018 | DC2 | 050 | 2 | 082 | R | 114 | r |
| 019 | DC3 | 051 | 3 | 083 | S | 115 | s |
| 020 | DC4 | 052 | 4 | 084 | T | 116 | t |
| 021 | NAK | 053 | 5 | 085 | U | 117 | u |
| 022 | SYN | 054 | 6 | 086 | V | 118 | v |
| 023 | ETB | 055 | 7 | 087 | W | 119 | w |
| 024 | CAN | 056 | 8 | 088 | X | 120 | x |
| 025 | EM | 057 | 9 | 089 | Y | 121 | y |
| 026 | SUB | 058 | : | 090 | Z | 122 | z |
| 027 | ESC | 059 | ; | 091 | [ | 123 | { |
| 028 | FS | 060 | < | 092 | \ | 124 | | |
| 029 | GS | 061 | = | 093 | ] | 125 | } |
| 030 | RS | 062 | > | 094 | ^ | 126 | ~ |
| 031 | US | 063 | ? | 095 | _ | 127 | DEL |

Fig. 6

METHOD AND DEVICE FOR AUTOMATING PROCEDURES FOR VERIFYING EQUIPMENT IN AN AIRCRAFT

BACKGROUND

The present invention relates to the maintenance operations and the functional tests performed in aircraft and more particularly to a method and a device for securely automating the procedures for verifying equipment items in an aircraft from a remote station, on the assembly line or during operation of the aircraft, by using the on-board information system as well as its topology.

To optimize the reliability of aircraft and to increase their profitability, on-line maintenance operations are frequently employed between the phases of flight.

In general, such operations consist, for example, in the case of maintenance operators, in verifying the hardware and software configuration of the aircraft systems, in analyzing the data stored in memory during the flight (continuous monitoring), in modifying certain aircraft parameters or certain software data, in launching test software applications and/or in checking the change of software configuration following a downloading operation.

The analyzed data are often obtained from transducers and stored in memory in a central diagnosis and storage device accessible via a man-machine interface of MCDU (initials for Multi-Control Display Unit in English terminology) or OMT (initials for Onboard Maintenance Terminal in English terminology) type. This interface, via which interactive operations can be launched, makes it possible to analyze data stored in memory, to access parameters of the aircraft and more generally to execute test and maintenance functions. By way of illustration, the Airbus A320, A330 and A340 are equipped with MCDUs and the Airbus A380 is equipped with an OMT (Airbus, A320, A330, A340 and A380 are trademarks).

Access to the maintenance systems of the aircraft is generally limited to fixed physical stations installed on board in the cockpit. Thus, when the aircraft is on the ground, a maintenance operator is able to board the aircraft to access and analyze the data stored in memory, to modify the parameters thereof if necessary and to launch test applications.

In order to ensure optimized sequencing of tasks, the current devices generally require the continuous presence of an operator to verify that the operations are being conducted properly.

Alternatively, mobile stations are being used to respond to an increasing demand of the airline companies in order to shorten the time for on-line maintenance operations. Such stations, whose function is similar to that of the interfaces of MCDU or OMT type, are connected to the central diagnosis and storage device via connection ports connected to the network of the aircraft.

FIG. 1 illustrates an example of an aircraft 100 comprising a central diagnosis and storage device 105 connected via a communication interface (not illustrated) to a fixed on-line maintenance station 110 installed in the cockpit.

Device 105 is connected to all systems of the aircraft that generate maintenance messages, for example to control transducers (not illustrated) of the engines and to actuators of the landing gear and control surfaces.

Thus, when aircraft 100 is on the ground, a maintenance operator is able, with the aid of fixed station 110, to analyze the flight data of the aircraft and to modify the parameters thereof.

Although this solution meets the expectations of the airline companies, it is necessary to use a hard-wired link between an aircraft and a station to achieve on-line maintenance operations. Such a constraint has the effect in particular of prolonging the duration of maintenance operations and consequently increasing the costs of operating the aircraft.

To alleviate these disadvantages, there exist diagnosis systems that use a wireless communication technology, wherein the data obtained from transducers can be transmitted directly to the mobile on-line maintenance station. For example European Patent 1306305 discloses a system in which the transducers are connected to data storage and transmission devices. In this way, a mobile station is able to obtain flight data on request.

However, such a system is limited to accessing data without permitting modification of the parameters of an aircraft, and it necessitates the use of several storage and transmission devices.

Similarly, during assembly of the aircraft, the final assembly line teams rely on interactive maintenance tools to achieve all or part of the functional tests of the aircraft and configuration tracking throughout the manufacturing process until delivery of the aircraft.

However, despite the performances of the maintenance stations, means for automating certain tests do not exist.

In fact, although certain maintenance stations installed on board aircraft can be connected to a communication network for exchange of data between the aircraft and remote equipment, the network connection does not permit remote control of the applications implemented on board the aircraft or transmission of data to these applications, for security reasons.

BRIEF SUMMARY

The invention makes it possible to solve at least one of the problems mentioned in the foregoing.

The object of the invention is therefore a method for testing or evaluating the configuration of at least one equipment item in an aircraft, the said aircraft comprising an on-board information system, the said information system comprising a secured part and a less secured part, the said less secured part comprising a network interface capable of exchanging data with an information system external to the said aircraft, the said secured part comprising at least one maintenance function, this method comprising the following steps, receiving at least one command to test or evaluate the configuration of the said at least one equipment item via the said network interface;

encoding the said at least one received command;

transmitting the said encoded command to the said secured part of the said information system of the said aircraft;

in response to reception of the said encoded command, filtering the said at least one encoded test command; and in response to the said filtering step, translating and executing the said encoded command in relation to the said at least one maintenance function.

In this way the method according to the invention makes it possible to execute a maintenance function in a secured part of an information system of an aircraft from a remote station, without affecting the security of this part of the information system, by using the existing information system and its topology.

Advantageously, the method additionally comprises a step of determining a result in response to the said execution of the said at least one command and a step of transmitting the said result to the said information system external to the said aircraft via the said communication interface, to permit a remote station to receive and analyze the result of a function executed in a secured part of an information system of an aircraft.

According to a particular embodiment, the said step of transmitting the said result comprises a step of transmitting the said result from the said secured part of the said information system of the said aircraft to the said less secured part of the said information system of the said aircraft, and a step of transmitting the said result from the said less secured part of the said information system of the said aircraft to the said information system external to the said aircraft. In this way the method according to the invention makes it possible to use the existing information system and topology of an aircraft to execute a maintenance function in a secured part of an information system of an aircraft and to obtain the result of this execution.

According to another particular embodiment, the said less secured part comprises at least one second maintenance function, distinct from the said at least one maintenance function, referred to as at least one first maintenance function, the method additionally comprising a step of evaluating the said at least one command capable of determining if the said at least one command is intended for the said secured part or for the said less secured part of the said information system of the said aircraft, the said steps of encoding, of transmitting, of filtering, of translating and of executing the said at least one command being executed if the said at least one command is intended for the said secured part of the said information system of the said aircraft. In this way the method according to the invention makes it possible to optimize the processing of commands to execute maintenance functions according to the intended recipient of these commands.

Advantageously, the method additionally comprises, if the said at least one command is intended for the said less secured part of the said information system of the said aircraft, a step of executing the said at least one received command in relation to the said at least one second maintenance function. The said at least one received command is preferably encoded prior to execution thereof.

According to a particular embodiment, the method additionally comprises an initial step of establishing a secured communication channel between the said information system of the said aircraft and the said information system external to the said aircraft in order to permit data exchange and to improve the security of data transmissions between a remote station and the information system of the aircraft.

Another object of the invention is a computer program comprising instructions capable of employing each of the steps of the method described in the foregoing, a device comprising means capable of employing each of the steps of the method described in the foregoing, as well as an aircraft comprising such a device.

BRIEF DESCRIPTION OF THE DRAWINGS

Other advantages, objectives and characteristics of the present invention become apparent from the detailed description provided hereinafter by way of non-limitative example, with reference to the attached drawings, wherein:

FIG. 6 shows an ASCII table and more particularly characters that can be used to transmit a command from the non-secured part to the secured part of an information system of an aircraft without compromising the security thereof;

DETAILED DESCRIPTION

According to a particular embodiment, the invention employs a system composed of the information system of the aircraft, comprising communication means such as IP communications means (initials for Internet Protocol in English terminology), and a remote station or an automatic test station situated, for example, on the ground. This system makes it possible to assure automation of tests and verification of the configuration of the logical systems of an aircraft.

The remote station or the automatic test station is connected to the on-board information system via a secured network such as an Ethernet network.

Securing of the connection can be assured, for example, by an element on the ground integrated in the network of the airline company and capable of employing a secured tunnel. The technology used preferably should make it possible to maintain a high level of security throughout the useful life of the aircraft.

To access the on-board maintenance functions from a remote station or test station, it is necessary to establish a secured connection between a server on the ground and the on-board component that is managing the communication means of the aircraft. When the tunnel is established, activities may be handled from the remote station or the test station.

Figure 1:
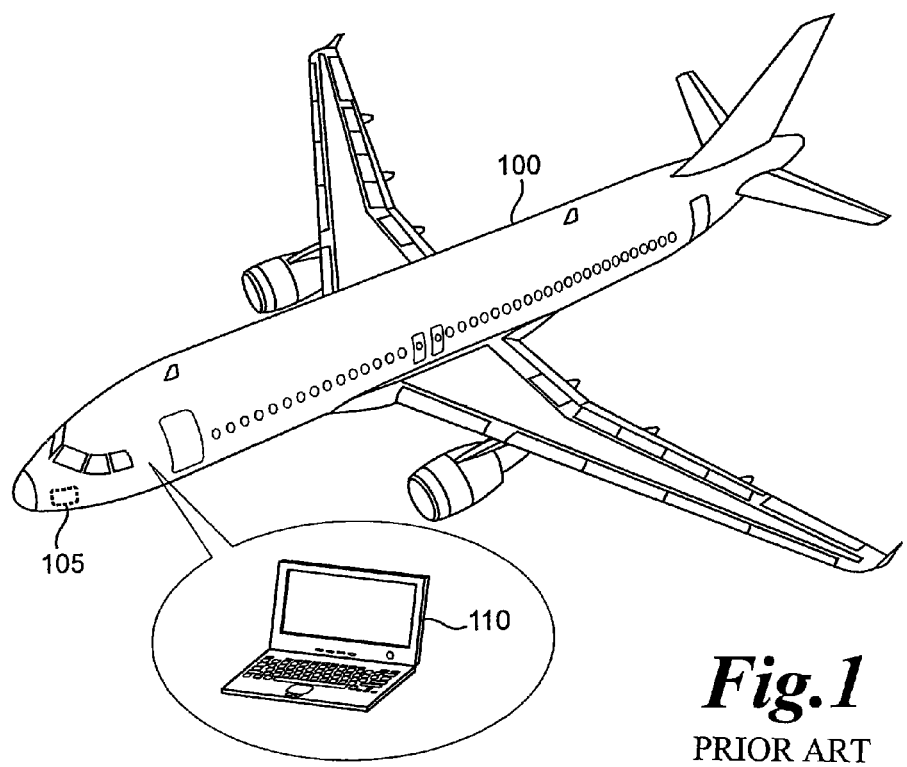
FIG. 1 shows an aircraft comprising a fixed maintenance station making it possible to analyze the flight data thereof and to modify the parameters of those data according to a standard plan.
Figure 2:
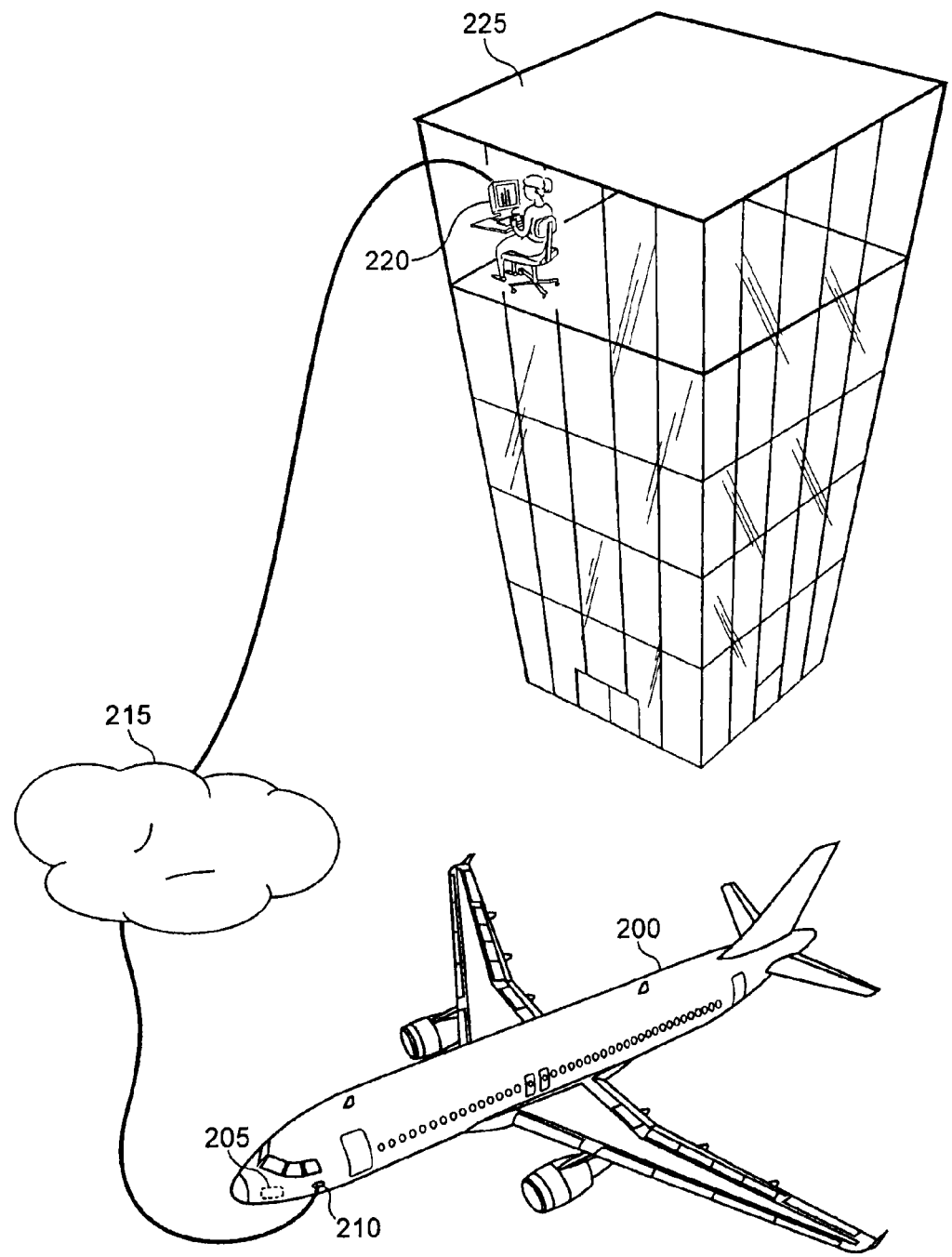
FIG. 2 schematically shows an example of an environment in which the present invention may be employed.

FIG. 2 schematically shows an example of an environment in which the present invention can be employed. Illustrated here is an aircraft 200 comprising a maintenance device 205 containing, for example, centralized diagnosis and storage tools, connected to a network connection port 210, in this example accessible from outside the aircraft. In this case, network connection port 210 is connected to network 215, using, for example, the IP protocol.

Device 205 is connected to all of the aircraft systems that generate maintenance messages, for example control transducers (not shown) of the engines and to actuators of the landing gear and control surfaces.

An on-line remote maintenance station 220, located in a maintenance center 225, for example, is connected to device 205 by a communication network 215 and port 210.

Thus, when aircraft 200 is on the ground, during assembly or during operation thereof, a maintenance operator is able, with the aid of remote station 220, to analyze the data of the aircraft, to modify the parameters thereof and/or to monitor the execution of maintenance application modules implemented therein.

Although the connection between aircraft 200 and network 215 is hard-wired in this case, wireless communication technologies such as WiMax and/or WiFi may be used. In this case, the aircraft comprises wireless communication means capable of establishing a communication with a compatible device located on the ground, in a satellite or in any type of vehicle, this device itself being connected to network 215.

Figure 3:
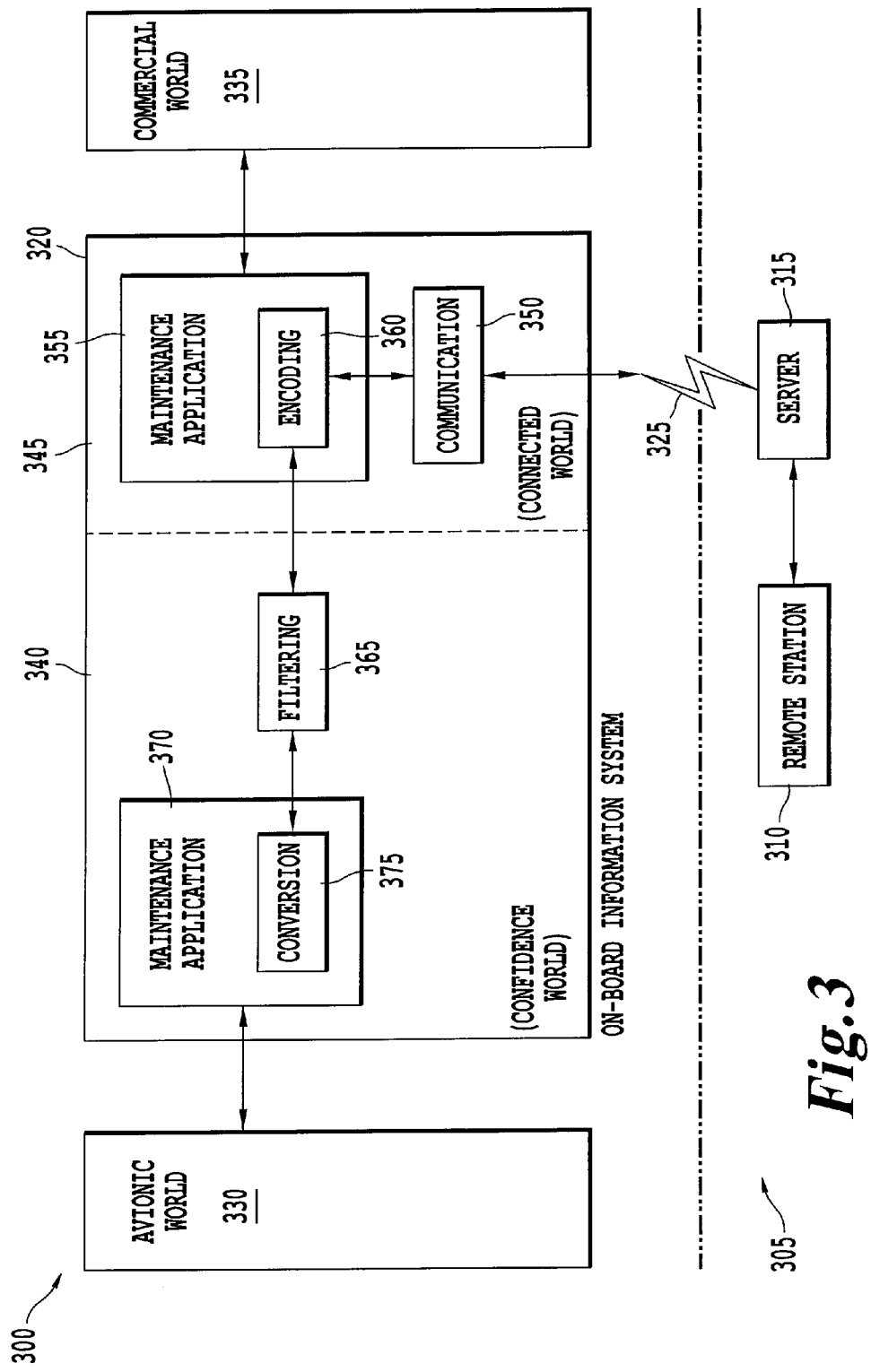
FIG. 3 illustrates the architecture of devices employed in the environment shown in FIG. 2.

FIG. 3 illustrates more precisely the architecture of devices employed in the environment represented in FIG. 2. In this case reference 300 denotes the systems installed on board the aircraft, while reference 305 denotes the remote systems belonging, for example, to the maintenance control center, also known as MCC (initials for Maintenance Control Center in English terminology), to the maintenance information system, also known as MIS (acronym for Maintenance Information System in English terminology) or to the final assembly center.

The remote system comprises a remote station or a test station 310, such as a portable computer of the PC type (initials for Personal Computer in English terminology), and a server 315, making it possible to establish a data communication with the on-board information system 320 of the aircraft via network 325.

Two types of data can be processed by the remote station or the test station: the data originating from the aircraft and the command data for managing the tests.

On-board information system 320 of the aircraft is connected to avionic systems 330, for example the flight control systems, the automatic pilot and the environment monitoring systems, and to the systems 335 of the commercial world, known as "open" systems, as opposed to the avionic world, by virtue of the origin of the processed data.

Furthermore, on-board information system 320 comprises two parts, a highly secured part 340, known as confidence world, and a less secured part 345, known as connected world.

Less secured part 345 comprises a communication module 350 capable of receiving and transmitting data from and to network 325. Communication module 350 is connected to a maintenance application module 355, which itself comprises an encoding module 360 used for encoding data to be transmitted to secured part 340 of on-board information system 320.

Secured part 340 comprises a filtering module 365 capable of monitoring the data transmitted by less secured part 345.

Secured part 340 additionally comprises a maintenance application module 370, itself comprising a conversion module 375 capable of converting the data received from filtering module 365 so that they will be processable by maintenance application module 370.

As illustrated, maintenance application module 355 of less secured part 345 is connected to the systems of commercial world 335, while maintenance application module 370 of secured part 340 is connected to the systems of avionic world 330.

Figure 4:
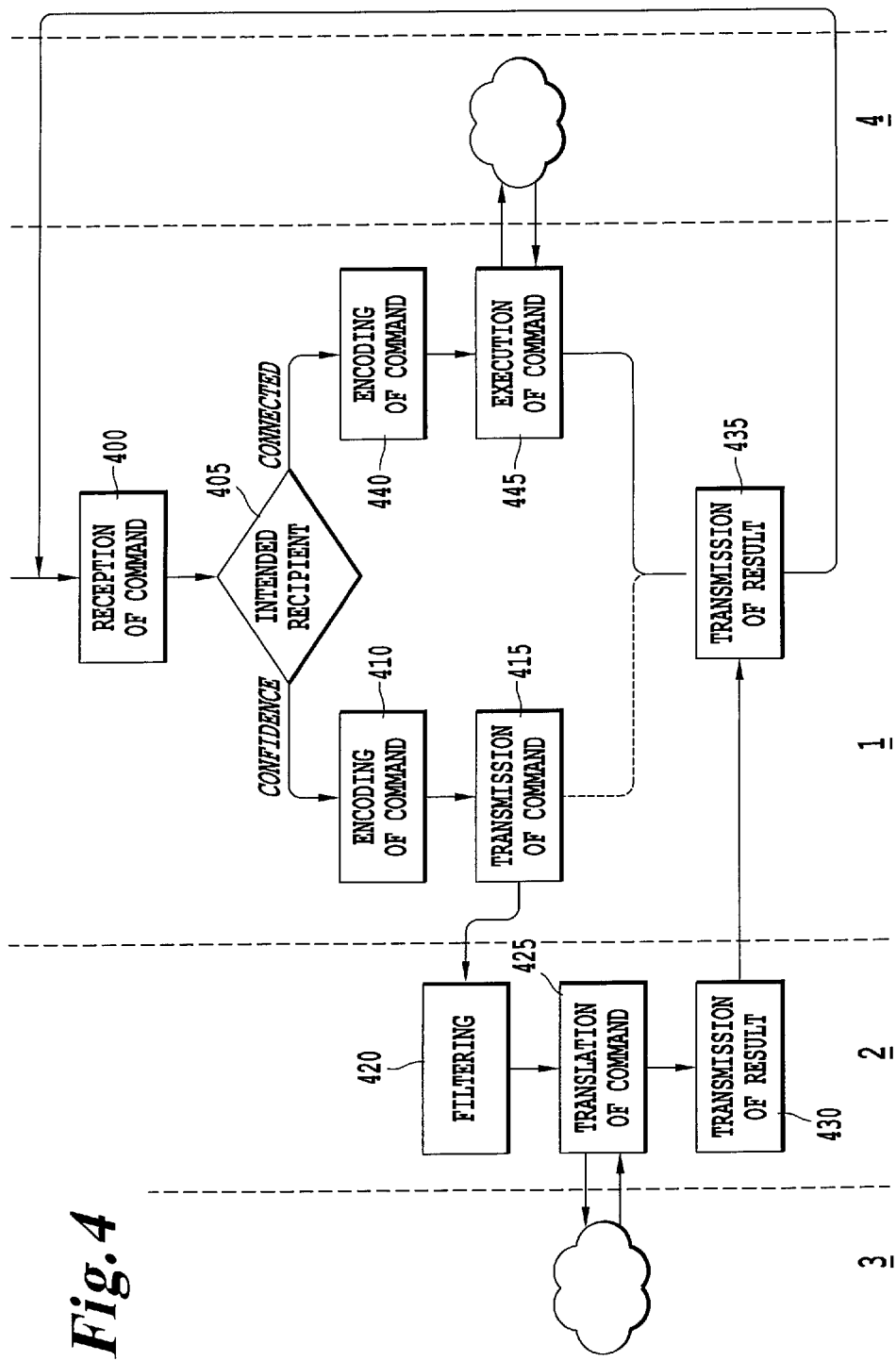
FIG. 4 schematically illustrates the algorithm employed in the information system of an aircraft, in accordance with the invention, in order to permit automation of final assembly-line tests of the aircraft and/or automation of periodic verification operations executed by the airline company that operates the aircraft.

FIG. 4 schematically illustrates the algorithm employed in the information system of an aircraft, in accordance with the invention, to permit automation of final assembly-line tests of the aircraft and/or automation of periodic verification operations executed by the airline company that operates the aircraft.

Reference ① in this case denotes the part of the algorithm employed in the non-secured part of the information system of the aircraft, reference ② denotes the part of the algorithm employed in the secured part of the information system of the aircraft, reference ③ denotes the functions employed in the confidence world, or in other words the avionics in this case, and reference ④ denotes the functions employed in the commercial world.

After a command (step 400) has been received from a remote station or from a test station via, for example, a previously established, secured communication tunnel, a test is performed (step 405) to identify the intended recipient of the received command.

If the intended recipient of the received command is situated in the confidence world, the command is encoded (step 410) to make it compatible with the filter used at the input of the secured part, then is transmitted thereto (step 415). The exchange of a command and/or of data between the secured and non-secured parts is preferably achieved via a dedicated internal network.

The encoding consists, for example, in encoding the commands in the form of frames having a predetermined format and/or characteristics. The filtering then consists in verifying this format and/or these characteristics.

As indicated in the foregoing, when the secured part of the information system of the aircraft receives a command from the non-secured part, the received command is filtered (step 420) by means of a robust filter. The commands not conforming to the predetermined criteria of the filter are rejected. The filtered commands are converted or translated (step 425) by a translation module of the secured part to permit their execution by the intended maintenance function.

The requested maintenance function, for example a module for management of interactive tests or a module for management of test configuration, executes the received command or manages the execution thereof, and preferably sends a response, such as a configuration or a result, to the command translation module, which constructs a corresponding file. This file is then transmitted (step 430) to the maintenance function of the non-secured part of the information system of the aircraft, which transfers the received information items to the remote station (step 435).

If the intended recipient of the received command is situated in the connected world, the command is encoded (step 440) in standard manner, to make it compatible with the protocols used in the systems of the connected world.

The requested maintenance function, for example a module for management of interactive tests, executes the received command (step 445) or manages the execution thereof. If a response is determined, for example a configuration or a result, it is transmitted to the remote station (step 435).

The algorithm illustrated in FIG. 4 makes it possible to employ different test and/or verification scenarios during final assembly and/or during operation of the aircraft.

According to a first example, the mode of operation for achieving a sequence of automatic tests in the avionics is the following (although such a sequence of tests is performed in this case on the final assembly line of the aircraft, an equivalent sequence many be used during operation of the aircraft).

A test application hosted by the remote station first sends an initialization command over the network to an element of the maintenance function hosted in the connected world. After this command has been received (step 400) and the determination has been made that it is intended for the secured part of the information system of the aircraft (step 405), the element of the maintenance function encodes the command to make it compatible with the robust filter (step 410). The encoded command is then transmitted to the filter of the secured part (step 415).

After the command has been filtered (step 420), and if it has not been rejected, it is translated and transmitted to the corresponding maintenance function of the secured part in order to be executed (step 425). The requested maintenance function, in this case the module for management of interactive testing, executes the received command and, in response to the initialization command, transmits its configuration to the command translator, which constructs, for example, a corresponding file.

The file is then sent to the maintenance function of the connected world (step 430), which in turn transmits the file to the remote station (step 435).

The remote station verifies that the resulting file conforms to the initialization command. In the affirmative, the remote station constructs the following command to initiate a test action and transmits it to the information system of the aircraft. If the result does not conform, an error message is recorded.

After a first test command has been received (step 400) and the determination has been made that it is intended for the avionics (step 405), the maintenance function of the non-secured part of the information system of the aircraft encodes the command (step 410) to make it compatible with the filter of the secured part and transmits it thereto (step 415).

After the command has been filtered (step 420), it is translated in order to permit the maintenance function, in this case the module for management of interactive testing or the module for management of configuration of equipment items of the aircraft, to launch the test (step 425). The target or targets executes or execute the test and, as the case may be, the maintenance function calculates the test result. The result is transmitted via the command translator, which constructs, for example, a corresponding file, to the maintenance function of the non-secured part of the information system of the aircraft (430), which retransmits it to the remote station (step 435).

The remote station then can analyze the test result file and record it.

To automate all of the tests of a scenario, the sequence hereinabove must be repeated for all targets in question.

The test command transmitted to the avionics may relate in particular to a test as such, for example a functional test of an equipment item of the aircraft, or to management of the configuration of equipment items of the aircraft, especially an element of the avionics.

It should be noted that several methods exist for determining the configuration of equipment items of the aircraft. A first solution consists in interrogating each target, or in other words each element being tested. Alternatively, a second solution consists in accessing a configuration file determined and recorded by the maintenance function. According to this second solution, it is not necessary to analyze the configurations of the equipment items during the test.

According to a second example, the operating mode for achievement of a sequence of automatic tests in the systems of the connected mode and commercial mode is the following (once again, such a sequence of tests is executed in this case on the final assembly line of the aircraft).

As in the foregoing, a test command comprising a test application is transmitted over the network by the remote station, to an element of the maintenance function hosted in the non-secured part of the information system of the aircraft. After the command has been received (step 400) and the determination has been made that the received command is intended for the systems of the connected world (step 405), the element of the maintenance function encodes the command (step 440) in order to make it compatible with the protocols of the connected world.

The target of the connected world executes the test (445). If a result is expected, the element of the maintenance function recovers the test result and transmits it to the remote station (step 435), which can analyze the test result and record it.

In order to automate all of the tests of a scenario, the foregoing sequence is repeated for each intended target.

As indicated in the foregoing, the purpose of the filter is to filter the data received from the network, in order to transmit only the correctly formatted data to the secured part of the information system of the aircraft.

The filtering module is preferably based on the sieve principle, or in other words on an iterative mechanism, wherein several levels of filters are used to optimize the processing times. Thus it is composed of several elements making it possible to filter the received data increasingly finely in order to allow passage of only the data corresponding to valid commands.

The filtering module necessitates that a command format be defined in order that only a certain type of network frames is processed. The format and the associated transport protocol can be defined in the form of parameters, accessible to the filtering module. For example, such parameters may stipulate that the commands be received in the form of Ethernet frames, indicate the sources authorized to transmit such commands, allocate a maximum lifetime to the frames, beyond which the frames are not taken into account, and indicate the characters that can be validly used to encode a command in a frame.

By way of illustration, the filtering of Ethernet frames can be achieved in three steps.

Figure 5:
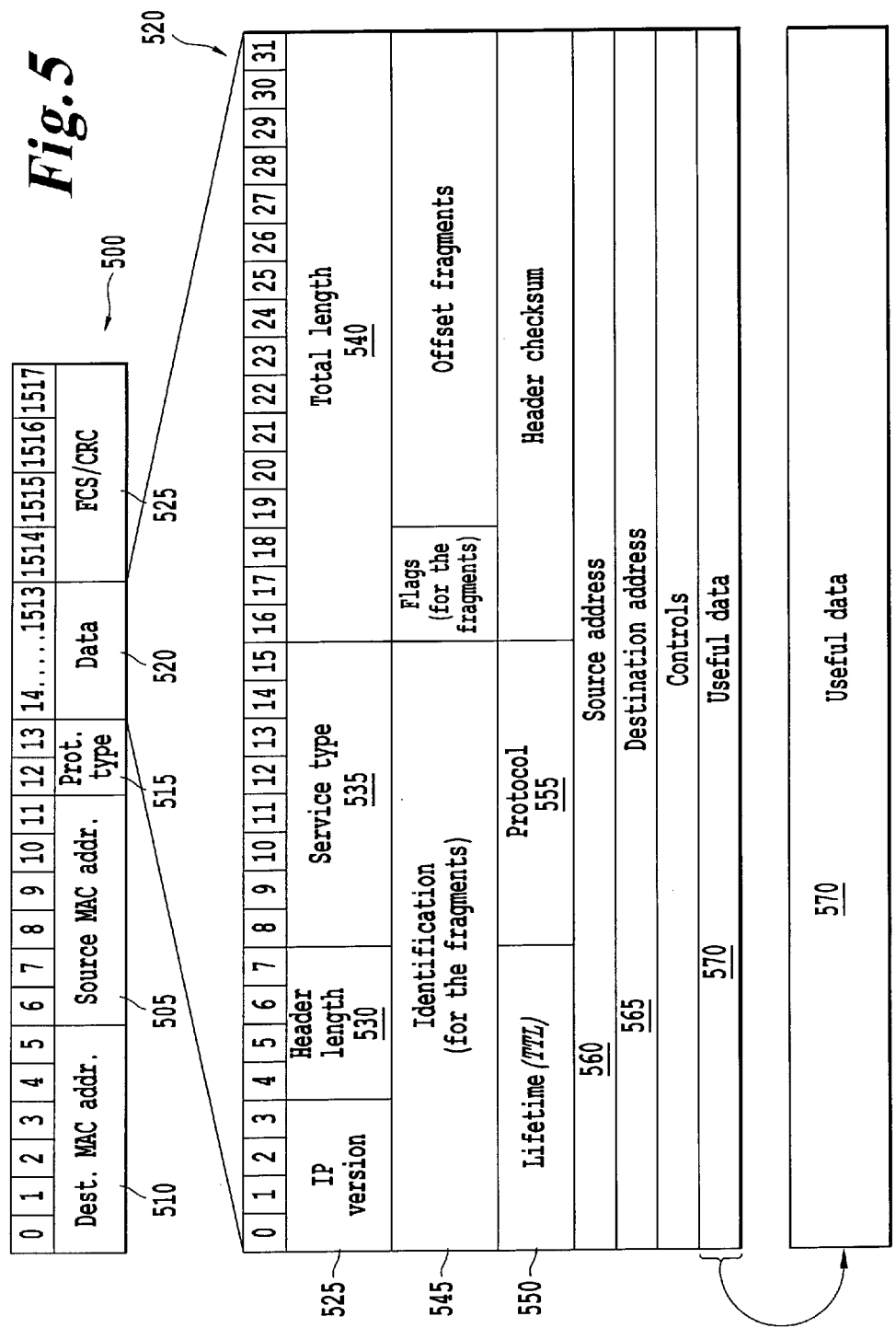
FIG. 5 partially shows an Ethernet frame used to transmit a command that can be subjected to filtering.

FIG. 5 partially shows an Ethernet frame 500 to which filtering can be applied according to these three steps.

Firstly, each frame is analyzed by verifying, for example, source physical address 505 and destination physical address 510, especially the MAC addresses (acronym for Media Access Control in English terminology), protocol type 515 and signature 525 of the complete frame. Data 520 of the frame are not analyzed in this first step.

If source physical address 505 and destination physical address 510, protocol type 515 and signature 525 do not conform to the parameters of the filtering module, the frame is rejected.

On the other hand, if source physical address 505 and destination physical address 510, protocol type 515 and signature 525 conform to the parameters of the filtering module, a second filtering step is employed.

It should be noted here that the first filtering step can be applied to data other than those cited, or on the other hand to fewer data.

The second step consists, for example, in analyzing data header 520. In particular, this second filtering step may consist in verifying IP version 525 (initials for Internet Protocol in English terminology), header length 530, service type 535, total data length 540, identification 545 used to reconstitute the fragments, lifetime 550, also known as TTL (initials for Time To Live in English terminology), protocol 555 and source address 560 and destination address 565.

Once again, if all of these information items do not conform to the parameters of the filtering module, the frame is rejected. On the other hand, if all of these information items conform to the parameters of the filtering module, a third filtering step is employed.

It should be noted here also that the second filtering step may be applied to data other than those cited, or on the other hand to fewer data.

The third step consists in this case in analyzing the characters of useful data 570 of the frame. Thus this step makes it possible to verify that the characters necessary for construction of the command cannot be used to construct the executable code. Advantageously, all the characters of the useful data must be chosen from the ASCII table, within the values between 032 and 090, as illustrated in FIG. 6.

If a character of useful data 570 does not belong to the ASCII table, between the values 032 and 090, the frame is rejected. On the other hand, if all the characters of useful data 570 belong to the ASCII table, between the values 032 and 090, the frame is transmitted to the secured part of the information system of the aircraft to be processed therein.

Naturally the third step of filtering may be applied to other criteria, especially more restrictive criteria.

The purpose of translation of the filtered commands is to establish an interface between the maintenance functions and the network.

This module is preferably developed in such a way that only the commands pertaining to instructions corresponding to maintenance functions implemented in the secured part of the information system of the aircraft have an action. This means that this module knows the instructions that may be executed by each application. In other words, a list of instructions or of a sequence of instructions is preferably stored in memory beforehand. Such a list defines a set of configurations of possible sequencings of instructions. This list may also define prohibited combinations.

This configuration is constructed in such a way that the sequencing of instructions of an application is known a priori. This permits the conversion module to verify that the commands that it receives and the sequencing of the associated instructions conforms to what the application is supposed to execute. This verification permits the conversion module to reject any unexpected sequencing and in this way to ensure that dangerous operations cannot be executed.

In a particular embodiment, the conversion module uses a table of correspondence between command names and the effective functions, or in other words instruction sequences, in order to associate one or more instructions with the command names received from the remote station. It should be noted here that the instructions may have several forms. For example, they may be pointers to functions or commands interfaced with the operating system of the maintenance device. The instructions make it possible in particular to simulate an action entered by a user at the maintenance-device interface accessible in the aircraft.

Figures 7, 8:
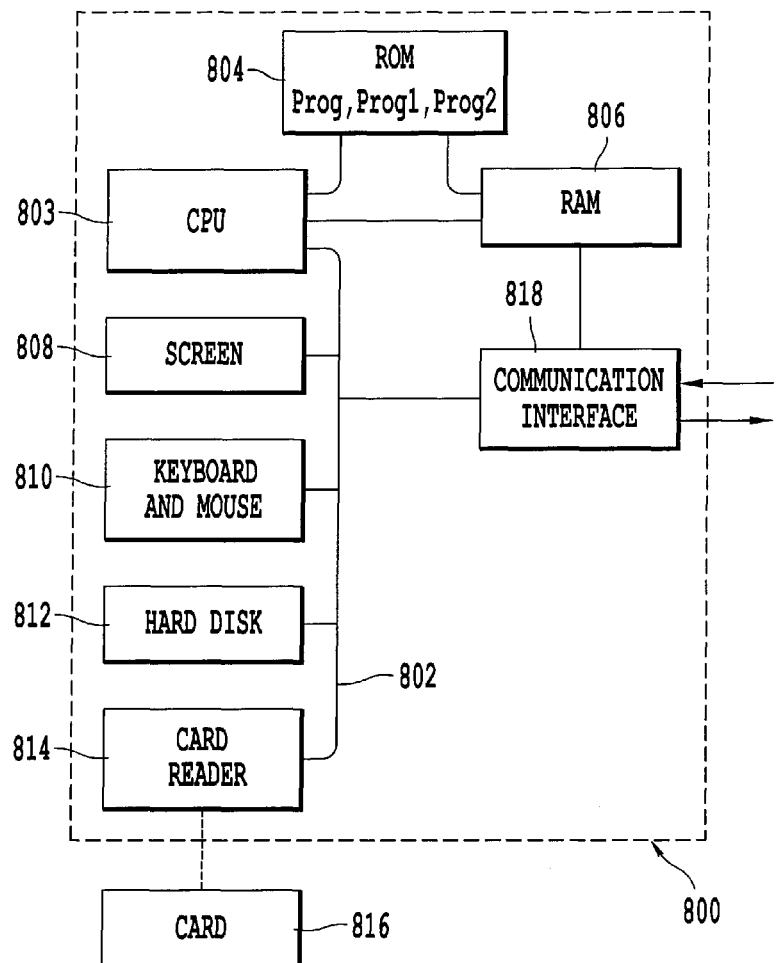
FIG. 7 illustrates an example of a correspondence table that can be used by a conversion module to establish correspondence links between commands and instructions.
FIG. 8 illustrates an example of a device capable of employing the invention or part of the invention.

FIG. 7 illustrates an example of a correspondence table 700 that can be used by the conversion module.

In this case correspondence table 700 comprises two columns: a column 705 containing the command names and a column 710 containing the list of instructions associated with each command.

Line 715 illustrates an example of a command to test a flight management device, referred to as FMU (initials for Flight Management Unit in English terminology). In this case the name of the command that can be used by a maintenance operator from a remote station is TEST:FMU. As shown, this command corresponds to execution of the instruction sequence comprising the instructions Set_Param(a, b, c), AutoTest_FMU1 and AutoTest_FMU2.

After a command has been analyzed and declared to be in conformity, the conversion module transmits the corresponding instructions to the application in question. The application executes the instructions and in general returns a response. This response is received by the conversion module, which constructs a response message, preferably signed.

By way of illustration, returning to the example illustrated in FIG. 7, the operating mode for execution of instructions corresponding to the command TEST:FMU is the following, the operator enters the command TEST:FMU at the remote station;

the command TEST:FMU is transmitted to the information system of the aircraft via a communication network;

the command received by the aircraft is encoded then filtered;

the instruction sequence corresponding to the filtered command is identified, in this case being the instructions Set_Param(a, b, c), AutoTest_FMU1 and AutoTest_FMU2;

these instructions are transmitted by a software layer of API type (initials for Application Programming Interface in English terminology) to the intended applications (as if the command had been generated by keystrokes at a fixed station);

the intended applications execute the instructions in conformity with the command and transmit the results to the conversion module via the software layer of API type; and, the conversion module forms a response message, for example by constructing a screen page or part of a screen page comprising the results, signs the response message to attest to the origin and integrity of the furnished information, and transmits the response message to the remote station via the communication network.

In the case of automatic tests, it is also possible to use a software application implemented on the remote station to generate a concatenation of commands in order to create a complete test scenario.

A device adapted for employment of the invention or part of the invention is illustrated in FIG. 8. Device 800 is, for example, a computer or a microcomputer.

In the present case, device 800 is provided with a communication bus 802, to which there are connected:

a central processing unit or microprocessor 803 (CPU, Central Processing Unit);

a read-only memory 804 (ROM, the acronym for Read Only Memory in English terminology), which may be provided with the programs "Prog", "Prog1" and "Prog2";

a random-access memory or cache memory 806 (RAM, the acronym for Random Access Memory in English terminology), comprising registers capable of recording variables and parameters created and modified in the course of execution of the aforesaid programs; and a communication interface 818, capable of transmitting and receiving data.

Optionally, device 800 may also be provided with:

a screen 808, for visualizing data and/or for acting as a graphical interface with the user who will be able to interact with the programs according to the invention, with the aid of a keyboard and of a mouse 810, or of another pointing device such as a light pen, a touch screen or a remote control;

a hard disk 812, which can comprise the aforesaid programs "Prog", "Prog1" and "Prog2" and data processed or to be processed according to the invention; and a memory card reader 814 capable of receiving a memory card 816 and reading or writing therein data processed or to be processed according to the invention.

The communication bus permits communication and interoperability among the different elements included in device 800 or connected thereto. The depiction of the bus is not limitative and, in particular, the central unit is capable of communicating instructions to any element of device 800 directly or via another element of device 800.

The executable code of each program permitting the programmable device to employ the process according to the invention may be stored, for example, on hard disk 812 or in read-only memory 804.

According to one variant, memory card 816 may contain data, especially signature keys, as well as the executable code of the aforesaid programs, which code will be stored on hard disk 812 once it has been read by device 800.

According to another variant, it will be possible for the executable code of the programs to be received at least partly via interface 818 to be stored in a manner identical to that described in the foregoing.

More generally, it will be possible for the program or programs to be loaded into one of the storage means of device 800 before being executed.

Central unit 803 will command and direct the execution of the instructions or portions of software code of the program or programs according to the invention, which instructions are stored on hard disk 812 or in read-only memory 804 or else in the other aforesaid storage elements. During boot-up, the program or programs stored in a non-volatile memory, such as hard disk 812 or read-only memory 804, are transferred to random-access memory 806, which then contains the executable code of the program or programs according to the invention as well as registers for storing in memory the variables and parameters necessary for employment of the invention.

The communication apparatus containing the device according to the invention may also be a programmed apparatus. This apparatus then contains the code of the computer program or programs resident, for example, in an application-specific integrated circuit (ASIC).

It should be noted that the maintenance application modules of the avionics, just as all the on-board software applications of the secured part of the information system of the aircraft, are developed in accordance with strict aeronautical standards, making it possible to guarantee a certain level of security and to demonstrate a level of prediction of the behavior of the system.

By way of illustration, the hosting platform of the maintenance application modules of the avionics, for which the desired software quality assurance level is DAL C, is developed in such a way that the level of control of the on-board code ensures in particular the integrity of the generated information items (the hosting platform, for example, is developed according to the DO-178B aeronautical standard).

Thus the employment of the invention in such a context makes it possible to guarantee a certain level of integrity of the data and results transmitted to the remote station.

Naturally, to satisfy specific needs, a person competent in the field of the invention will be able to apply modifications in the foregoing description.

The invention claimed is:

1. A method for testing or evaluating a configuration of at least one equipment item in an aircraft, the aircraft including an on-board information system, the on-board information system including a secured part and a less secured part, the less secured part including a network interface configured to exchange data with an information system external to the aircraft, the secured part including a filtering module to filter the data received by the less secured part and including at least one first maintenance function, the method comprising:
   receiving within the information system of the aircraft at least one command to test or evaluate the configuration of the at least one equipment item via the network interface;
   encoding, in the less secured part, the at least one received command according to predetermined criteria to make the at least one received command compatible with the filtering module of the secured part when the at least one received command is intended for the secured part, and to make the at least one received command compatible with protocols of the less secured part when the at least one received command is intended for the less secured part;
   transmitting the encoded command intended for the secured part to the filtering module of the secured part of the information system of the aircraft;
   in response to reception of the transmitted encoded command, filtering within the filtering module of the secured part the at least one encoded test command to verify that the at least one encoded test command conforms to the predetermined criteria; and
   in response to the filtering, translating and executing the filtered encoded command in relation to the at least one first maintenance function.

2. The method according to claim 1, further comprising:
   determining a result in response to the executing the at least one command; and
   transmitting the result to the information system external to the aircraft via the network interface.

3. The method according to claim 2, wherein the transmitting the result comprises transmitting the result from the secured part of the information system of the aircraft to the less secured part of the information system of the aircraft, and transmitting the result from the less secured part of the information system of the aircraft to the information system external to the aircraft.

4. The method according to claim 1, wherein the less secured part comprises at least one second maintenance function, distinct from the at least one first maintenance function, wherein the method further comprises evaluating the at least one command to determine when the at least one command is intended for the secured part or for the less secured part of the information system of the aircraft.

5. The method according to claim 4, further comprising, when the at least one command is intended for the less secured part of the information system of the aircraft, executing the at least one received command in relation to the at least one second maintenance function.

6. The method according to claim 5, wherein the at least one received command is encoded prior to execution thereof.

7. The method according to claim 1, further comprising establishing a secured communication channel between the information system of the aircraft and the information system external to the aircraft.

8. The method according to claim 1, further comprising, prior to the encoding, testing the at least one received command to determine when an intended recipient of the at least one received command is in the less secured part or the secured part.

9. The method according to claim 1, wherein the filtering includes requiring that the at least one encoded command be received as Ethernet frames, indicate sources authorized to transmit the at least one encoded command, allocate a maximum lifetime to the Ethernet frames beyond which the Ethernet frames are not taken into account, and indicate characters that are validly used in the encoding the at least one command.

10. The method according to claim 1, wherein the at least one encoded command is an Ethernet frame and the filtering further comprises:
   verifying a source physical address, a destination physical address, a protocol type, and a signature of the Ethernet frame,
   analyzing a data header of the Ethernet frame, and
   analyzing characters of useful data of the Ethernet frame.

11. The method according to claim 10, wherein when the source physical address, the destination physical address, the protocol type, and the signature of the Ethernet frame do not conform to parameters of the predetermined criteria of the filtering module, the Ethernet frame is rejected.

12. The method according to claim 10, wherein when the data header of the Ethernet frame does not conform to parameters of the predetermined criteria of the filtering module, the Ethernet frame is rejected.

13. The method according to claim 10, wherein when the characters of useful data of the Ethernet frame are not chosen from an ASCII table within values between 032 and 090, the Ethernet frame is rejected.

14. A non-transitory computer readable medium storing a program that, when executed by a computer, causes the computer to execute:

receiving within an information system of an aircraft at least one command to test or evaluate a configuration of at least one equipment item via a network interface;

encoding, in a less secured part of the information system, the at least one received command according to predetermined criteria to make the at least one received command compatible with a filtering module of a secured part of the information system when the at least one received command is intended for the secured part, and to make the at least one received command compatible with protocols of the less secured part when the at least one received command is intended for the less secured part;

transmitting the encoded command intended for the secured part to the filtering module of the secured part of the information system of the aircraft;

in response to reception of the transmitted encoded command, filtering within the filtering module of the secured part the at least one encoded test command to verify that the at least one encoded test command conforms to the predetermined criteria; and in response to the filtering, translating and executing the filtered encoded command in relation to at least one first maintenance function.

15. The non-transitory computer readable medium according to claim 14, wherein the filtering includes requiring that the at least one encoded command be received as Ethernet frames, indicate sources authorized to transmit the at least one encoded command, allocate a maximum lifetime to the Ethernet frames beyond which the Ethernet frames are not taken into account, and indicate characters that are validly used in the encoding the at least one command.

16. The non-transitory computer readable medium according to claim 14, wherein the at least one encoded command is an Ethernet frame and the filtering further comprises:

verifying a source physical address, a destination physical address, a protocol type, and a signature of the Ethernet frame, analyzing a data header of the Ethernet frame, and analyzing characters of useful data of the Ethernet frame.

17. The non-transitory computer readable medium according to claim 16, wherein when the source physical address, the destination physical address, the protocol type, and the signature of the Ethernet frame do not conform to parameters of the predetermined criteria of the filtering module, the Ethernet frame is rejected.

18. The non-transitory computer readable medium according to claim 16, wherein when the data header of the Ethernet frame does not conform to parameters of the predetermined criteria of the filtering module, the Ethernet frame is rejected.

19. The non-transitory computer readable medium according to claim 16, wherein when the characters of useful data of the Ethernet frame are not chosen from an ASCII table within values between 032 and 090, the Ethernet frame is rejected.

20. A device, comprising:

a receiver to receive within an information system of an aircraft at least one command to test or evaluate a configuration of at least one equipment item via a network interface;

an encoder in a less secured part of the information system to encode the at least one received command according to predetermined criteria to make the at least one received command compatible with a filter of a secured part of the information system when the at least one received command is intended for the secured part, and to make the at least one received command compatible with protocols of the less secured part when the at least one received command is intended for the less secured part;

a transmitter to transmit the encoded command intended for the secured part to the filter of the secured part of the information system of the aircraft;

the filter to filter, in response to reception of the transmitted encoded command, the at least one encoded test command to verify that the at least one encoded test command conforms to the predetermined criteria; and a unit to translate and execute, in response to the filtering, the filtered encoded command in relation to at least one first maintenance function.

21. The device according to claim 20, wherein the filter requires that the at least one encoded command be received as Ethernet frames, indicate sources authorized to transmit the at least one encoded command, allocate a maximum lifetime to the Ethernet frames beyond which the Ethernet frames are not taken into account, and indicate characters that are validly used in the encoding the at least one command.

22. The device according to claim 20, wherein the at least one encoded command is an Ethernet frame and the filter further comprises:

a unit to verify a source physical address, a destination physical address, a protocol type, and a signature of the Ethernet frame, a unit to analyze a data header of the Ethernet frame, and a unit to analyze characters of useful data of the Ethernet frame.

23. An aircraft, comprising:

a device including a receiver to receive within an information system of the aircraft at least one command to test or evaluate a configuration of at least one equipment item via a network interface;

an encoder in a less secured part of the information system to encode the at least one received command according to predetermined criteria to make the at least one received command compatible with a filter of a secured part of the information system when the at least one received command is intended for the secured part, and to make the at least one received command compatible with protocols of the less secured part when the at least one received command is intended for the less secured part;

a transmitter to transmit the encoded command intended for the secured part to the filter of the secured part of the information system of the aircraft;

the filter to filter within the information system of the aircraft, in response to reception of the transmitted encoded command, the at least one encoded test command to verify that the at least one encoded test command conforms to the predetermined criteria; and a unit to translate and execute, in response to the filtering, the filtered encoded command in relation to at least one first maintenance function.

24. The aircraft according to claim 23, wherein the filter requires that the at least one encoded command be received as Ethernet frames, indicate sources authorized to transmit the at least one encoded command, allocate a maximum lifetime to the Ethernet frames beyond which the Ethernet frames are not taken into account, and indicate characters that are validly used in the encoding the at least one command.

25. The aircraft according to claim 23, wherein the at least one encoded command is an Ethernet frame and the filter further comprises:
   a unit to verify a source physical address, a destination physical address, a protocol type, and a signature of the Ethernet frame,
   a unit to analyze a data header of the Ethernet frame, and
   a unit to analyze characters of useful data of the Ethernet frame.

* * * * *

UNITED STATES PATENT AND TRADEMARK OFFICE
CERTIFICATE OF CORRECTION

Page 1 of 1

PATENT NO.      : 8,761,993 B2
APPLICATION NO. : 12/543181
DATED           : June 24, 2014
INVENTOR(S)     : Georges Ric et al.

It is certified that error appears in the above-identified patent and that said Letters Patent is hereby corrected as shown below:

On the title page, Item (54) and in the Specification, Column 1, the Title is incorrect.
Item (54) and Column 1 should read:

-- METHOD AND DEVICE FOR AUTOMATING PROCEDURES FOR VERIFYING EQUIPMENT ITEMS IN AN AIRCRAFT --

Signed and Sealed this
Seventh Day of October, 2014

Michelle K. Lee
*Deputy Director of the United States Patent and Trademark Office*